(12) United States Patent
Rakotoarivony et al.

(10) Patent No.: US 10,417,185 B2
(45) Date of Patent: Sep. 17, 2019

(54) GESTURE BASED SEMANTIC ENRICHMENT

(71) Applicant: Business Objects Software Limited, Dublin (IE)

(72) Inventors: Louis Rakotoarivony, Verrieres le Buisson (FR); Alexandre Fortin, Paris (FR); Andrew Brown, Paris (FR)

(73) Assignee: Business Objects Software Limited, Dublin (IE)

( * ) Notice: Subject to any disclaimer, the term of this patent is extended or adjusted under 35 U.S.C. 154(b) by 206 days.

(21) Appl. No.: 15/333,579

(22) Filed: Oct. 25, 2016

(65) Prior Publication Data
US 2018/0113575 A1    Apr. 26, 2018

(51) Int. Cl.
*G06F 3/048*     (2013.01)
*G06F 16/16*     (2019.01)
*G06F 3/0486*    (2013.01)
*G06F 16/26*     (2019.01)
G06F 17/24       (2006.01)

(52) U.S. Cl.
CPC .......... *G06F 16/168* (2019.01); *G06F 3/0486* (2013.01); *G06F 16/26* (2019.01); *G06F 17/246* (2013.01)

(58) Field of Classification Search
CPC ............... G06F 3/04817; G06F 3/0482; G06F 3/04883; G06F 3/0486; G06F 3/0488; G06F 3/04845; G06F 3/04842; G06F 2203/04808; G06F 3/04886; G06F 3/0481; G06F 3/0484; G06F 17/30584; G06F 3/0346; G06F 3/04847; G06F 17/30014; G06F 2203/04803; G06F 2203/04806; G06F 3/041; G06F 9/451
See application file for complete search history.

(56) References Cited

U.S. PATENT DOCUMENTS

| | | | |
|---|---|---|---|
| 9,183,592 B2* | 11/2015 | Calibey | G06Q 40/08 |
| 2009/0177543 A1* | 7/2009 | Ram | G06Q 30/0222 |
| | | | 705/14.23 |
| 2010/0058182 A1* | 3/2010 | Jung | G06F 3/04817 |
| | | | 715/702 |
| 2010/0138763 A1* | 6/2010 | Kim | G06F 1/1626 |
| | | | 715/765 |
| 2011/0035691 A1* | 2/2011 | Kim | G06F 3/04817 |
| | | | 715/765 |

(Continued)

*Primary Examiner* — Di Xiao
(74) *Attorney, Agent, or Firm* — Buckley, Maschoff & Talwalkar LLC

(57) ABSTRACT

Provided are a system and method for semantic generation and enrichment. In one example, the method includes displaying a plurality of tiles on a user interface, each displayed tile visually representing a data entity obtained from a data file, detecting, via the user interface, a selection of a first displayed tile visually representing a first data entity and a second displayed tile visually representing a second data entity, and in response to detecting the selection via the user interface, generating a new data entity based on the first data entity visually represented by the first displayed tile and the second data entity visually represented by the second tile, and displaying a new tile visually representing the newly generated data entity. Accordingly, an end user can provide semantic creation and enrichment to visually displayed data without the need for an administrator.

20 Claims, 15 Drawing Sheets

(56) References Cited

U.S. PATENT DOCUMENTS

| | | | | |
|---|---|---|---|---|
| 2012/0117500 A1* | 5/2012 | Maim | .................. | G06F 17/246 715/769 |
| 2015/0309689 A1* | 10/2015 | Jin | ..................... | G06F 3/04817 715/765 |
| 2016/0110069 A1* | 4/2016 | Tanoue | ................ | G06F 3/0482 715/845 |

* cited by examiner

FIG. 1A

| Product | Retailer | ÷ Quantity | Unit Price | Custom Duty |
|---|---|---|---|---|
| Phone # 1 | New Edge CA | 300 | 300.00$ | 8,000.00$ |
| Phone # 2 | New Edge US | 200 | 290.00$ | 6,000.00$ |
| Phone # 3 | Infomac | 80 | 200.00$ | 800.00$ |
| Phone # 4 | Tryo | 60 | 900.00$ | 5,200.00$ |
| Phone # 5 | Genious | 40 | 160.00$ | 400.00$ |
| Phone # 6 | Spinouchi | 10 | 2,000.00$ | 1,200.00$ |
| Total | | 690 | $354.20 (AVG) | 21,600.00$ |

FIG. 2A

| Car | Category | Color | ↓ Quantity | |
|---|---|---|---|---|
| Kia Optima | Sedans | white | | 800 |
| Isetta | Economy Car | white | | 300 |
| Toyotat Auris | Family Car | black | | 245 |
| Fiat Panda | Economy Car | white | | 234 |
| Ford Mondeo | Sedans | white | | 234 |
| Peugeot 208 | Economy Car | black | | 233 |
| Citroën DS5 | Family Car | white | | 211 |
| | | Total | | 3,370 |

↗ 200

MEASURES

Quantity ⌐ 211

3370

⌐ 210

ATTRIBUTES

Color ⌐ 212

| Black | Grey |
|---|---|
| Blue | Red |
| Green | White |

Category ⌐ 214

Economy
Family
Luxury
Sedan
Sports car

Car ⌐ 213

| Audi A4 | Citroën DS5 |
|---|---|
| Audi A8 | Dodge Charger |
| BMW M5 | Ferrari 612 |

Action: User drops an image on a Measure tile

GESTURE BASED SEMANTIC ENRICHMENT

BACKGROUND

Many organizations analyze data in order to learn from, evaluate, and identify information about products, people, places, and the like, which relate to their organization. In order to better understand and analyze the data, it is often modified or enriched. Semantic enrichment refers to the enrichment of content/context of the data and may include tagging data, categorizing data, classifying data, and the like, in relationship to each other, based on dictionaries and other base reference sources. Furthermore, modification of data may include adding additional contextual information to an existing data set (e.g., adding traffic data to road maps to provide context of road conditions, probability of delay, length of projected obstructions, condition of road, etc.) or providing supplemental data to better learn from the existing data. In some cases, a system may automatically modify and/or enrich its understanding of the context and content of data by comparing the data to an existing knowledge store and then build upon that store.

Data enrichment may provide a number of advantages to an organization such as a further understanding of the context of their data enabling more intelligent responses to be generated, the ability to create proactive systems and responses based on aggregated data, an increased accuracy in projections and trends as a result of an enhanced understanding of the context of data from multiple data sources, enhanced reaction times based on evolving understanding of the context, and the like. However, in order to declare a semantic enrichment, an Information Technology (IT) tool is typically required which is controlled by an IT administrator and which is typically hidden from end-users. As a result, an end user is not able to perform semantic enrichment or is very limited in the types of enrichment they can perform. Furthermore, when a user wants to create a new calculated data measure from existing calculated data measures, the user is typically not aware of their options for creating a new measure due to semantic information not being surfaced. That is, knowledge of underlying semantic information is needed prior to calculating a new measure, but in most cases, such information is not user friendly or in a format that is capable of being understood by an end user.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 1A-1D are diagrams illustrating a process for generating a new visual representation of a measure of data in accordance with example embodiments.

FIGS. 2A-2D are diagrams illustrating a process for generating a new visual representation of a hierarchy of data in accordance with example embodiments.

Figure 1B:
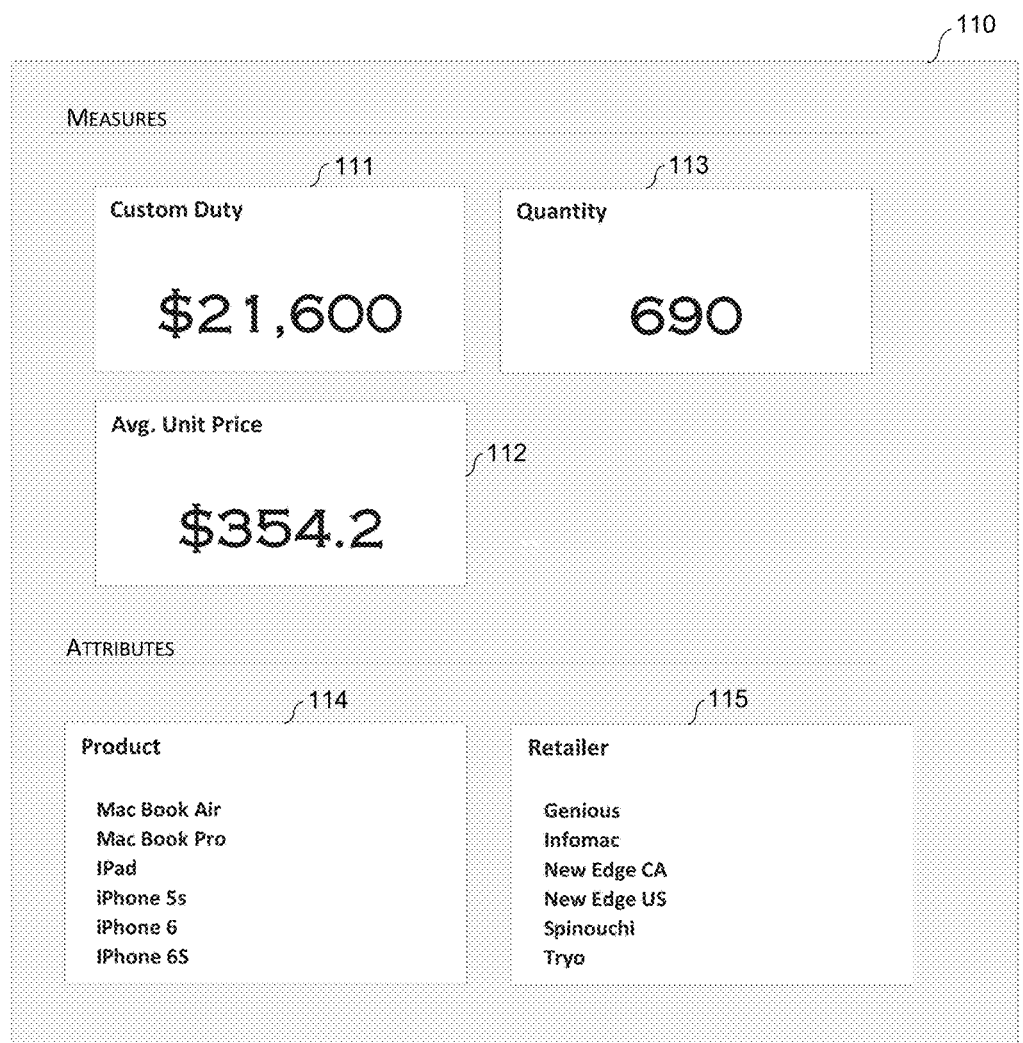

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are related to a system and method for semantically enhancing visually displayed data based on a simple user gesture without the need for an administrator or IT professional to modify the visually displayed data. The system may display a plurality of objects representing a plurality of data entities via a user interface. The system may perform semantic enrichment based on the user gesture (e.g., action, drag-and-drop, point, etc.) detected via the user interface with respect to the plurality of objects. As described herein, the system may include a front-end device such as a user computing device and a back-end device such as a server, cloud platform, and/or the like. In this example, the user device may display the user interface on a screen thereof with semantic information displayed therein (e.g., measures, attributes, and other data entities) calculated from or otherwise obtained from data stored locally or stored on the back-end device over a network. In this example, the back-end device may perform semantic enrichment on the displayed data based on a user action detected via the user interface. As another example, the examples herein may be performed by a single device that both displays semantic information and associated data and that also performs semantic enrichment and semantic generation.

According to various embodiments, the system may display tiles within a user interface. A tile may be a window, a graphical object, a pane, an image, and the like, positioned within the user interface. Each tile may be generated based on Hypertext Markup Language (HTML), JavaScript, and/or the like. A tile may visually represent a data entity, for example, a measure, an attribute, a calculation, a category, a hierarchy, and the like. The data entity may be displayed in alphanumeric form within the tile thereby notifying a user of the data entity associated with the tile. For example, the data entity may be a numerical value (e.g., a measure), an alphanumeric value (e.g., words, phrases, etc.), a hierarchy, and the like, extracted from a data file including one or more tables of data. That is, a tile may be used to visually represent a data value and also include a description or identification of the data value within the displayed tile.

According to various embodiments, a user may generate a new tile or semantically enrich an existing tile based on a user gesture input via the user interface. The user gesture may be a drag-and-drop operation, a point-and-click operation, and the like, on a tile. For example, when a user drags-and-drops a tile within a vicinity of another tile via the user interface, the system may generate a new tile based on the data entities included in the two tiles. Here, the new tile may display a new data entity that is calculated based on the data entities (e.g., numerical values) included in the two tiles. As another example, the new tile may display a category that is determined based on the data entities (e.g., attributes) included in the two tiles.

In some embodiments, rather than generate a new tile, a user gesture may be used to modify the data entity associated with a first tile with a data entity associated a second tile. For example, a user may drag-and-drop a first tile representing an underlying file (e.g., an image, a calendar, a geographic file, etc.) within a vicinity of a second tile representing a measure of data. In this case, a visual representation of the measure of data in the second tile may be modified based on the underlying file represented by the first tile. As another example, a visual representation of the measure of data in the second tile may be modified to include an image of an object included in an image file of the second tile.

Provided herein are examples of three datasets having a plurality of tiles generated and displayed based thereon. For example, FIGS. 1A-1D illustrate examples of a user interface displaying a plurality of tiles visually representing measures and attributes of data. In this series of screen shots, a user performs a selection of a first tile and a second tile where the two tiles each represent respective measures calculated from the data, to generate a new tile representing a new measure. As another example, FIGS. 2A-2D illustrate examples of a user interface displaying a plurality of tiles visually representing attributes of data. In this series of screen shots, a user performs a selection of a first tile and a second tile where the two tiles each represent respective attributes of the data. As another example, FIGS. 3A-3D illustrate various data entities being generated or modified based on user selections.

According to various embodiments, provided in these examples are visual presentations (in the form of tiles) of measures, attributes, and other data entities, so that, users can drag and drop them on or near other tiles, in order to create a new data entity. Another possibility is that users can drop an external object (file, external link) on a tile to enrich the semantic of the related entity. The user may import data into the system. Attributes and measures may be calculated, identified, or otherwise obtained, and be surfaced, and presented as tiles. The system computes a preview for each tile so that the user can clearly identify the underlying object. Drag and drop operations may be enabled on each of the tiles.

Figure 1C:
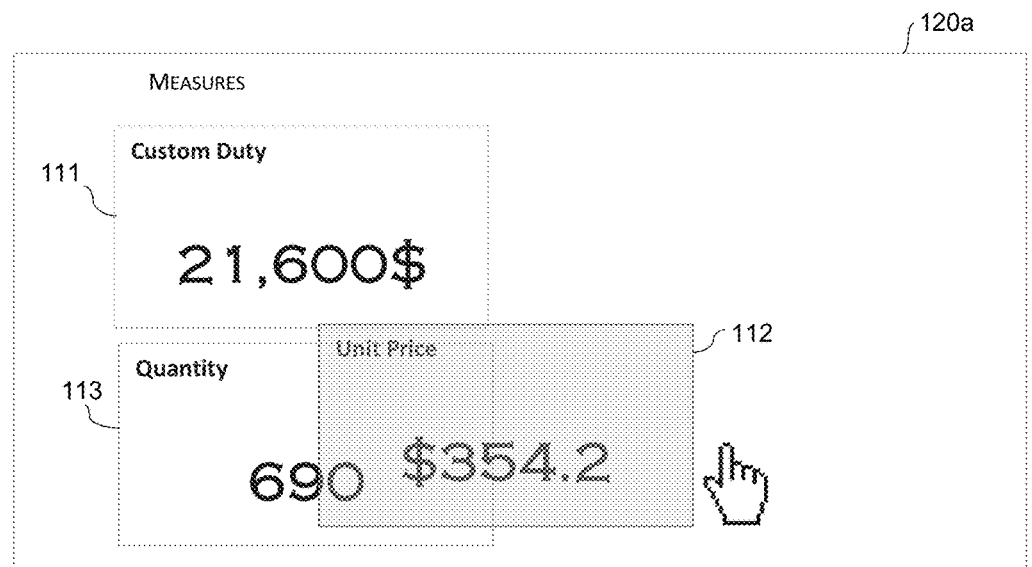
Figure 1C:
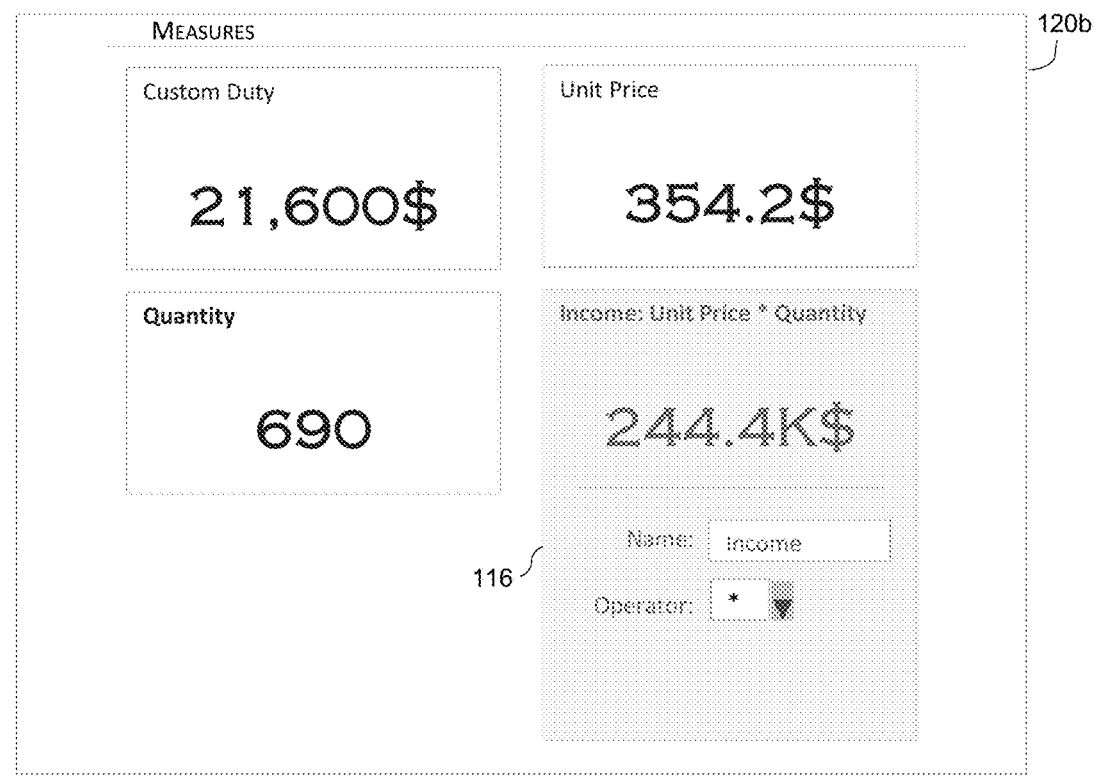
Figure 1D:

FIGS. 1A-1D illustrate a process for generating a new visual representation of a measure of data in accordance with example embodiments. The examples of FIGS. 1B-1D are based on the dataset 100 shown in FIG. 1A. Referring to FIG. 1A, a plurality of products and information related thereto is shown within the dataset 100. In this example, the dataset 100 is a table. However, it should be appreciated that the data may have various formats, for example, arrays, lists, and the like. FIG. 1B illustrates a user interface 110 including a plurality of tiles 111-115 generated based on data included in the dataset 100 of FIG. 1A. Here, the tiles includes three tiles (111, 112, and 113) visually representing three respective measures (custom duty, average price, and quantity) calculated from the dataset 100 and two other tiles (114 and 115) visually representing two attributes (product name and retailer) identified from the dataset 100. In this example, each of the tiles 111-115 is a polygon (e.g., square or rectangle) with graphics included therein visually representing a respective data entity associated with the tile. In this case, the tile 111 visually represents a measure of customs duty calculated from the dataset 100, the tile 112 represents the average price per product calculated from data in the dataset 100, and the tile 113 visually represents a total quantity of products calculate from data in the dataset 100. Meanwhile, the tile 114 visually represents product names identified from the dataset 110 and the tile 115 visually represents product retailers identified from the dataset 110.

In FIG. 1C, a user performs an action of dragging the displayed tile 112 towards the displayed tile 113 and dropping the tile 112 within a vicinity of the tile 113 (in this example, partially overlapping tile 113) in user interface 120a. According to various embodiments, the system can detect this user action and perform a semantic creation process based on the detected user action. In this example, in user interface 120b the system generates a new tile 116 based on data entities represented by tile 112 and tile 113. In this example, the system automatically performs a multiplication operation based on the semantic data values included in the tile 112 and the tile 113, but also provides a drop down box to perform a different mathematical operation based on the semantic values of the data entities. Furthermore, the system also provides an input bar to create a name for the newly generated tile 116. In this example, the system may attempt to auto-create a calculated measure. In this case, as the two measures do not have the same unit, the most common possibilities are multiplication or division operators. The multiplication operator * may be used by default, and can be changed by the user afterward, by clicking on the tile. As another example, the system may not auto-create the measure but may ask the user.

In FIG. 1D, the user performs an action of dragging the newly generated tile 116 towards tile 111 and dropping the tile 116 within a vicinity of the tile 111 in user interface 130a. In this example, in user interface 130b the system generates a new tile 117 based on data entities represented by the tile 111 and the tile 116. In this example, the system automatically performs a subtraction operation based on the semantic data values represented by tiles 111 and 116. In this case, as the two measures do have the same unit, the most common possibilities are addition or subtraction operators. The subtraction operator may be used by default, and can be changed by the user afterward, by clicking on the tile.

Figure 2B:
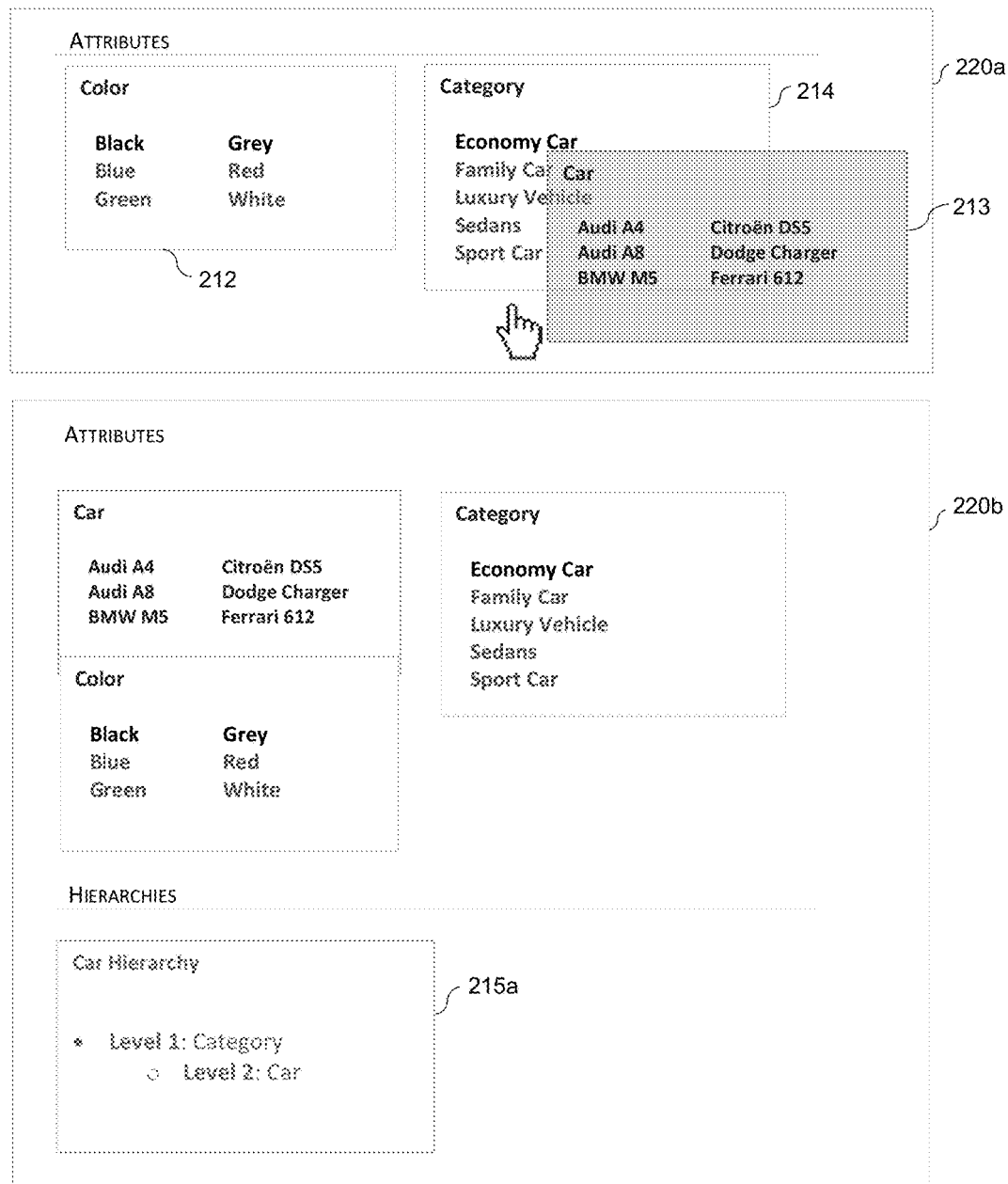

FIGS. 2A-2D illustrate a process for generating a new visual representation of a hierarchy of data in accordance with example embodiments. The examples of FIGS. 2A-2D are based on the dataset 200 shown in FIG. 2A. Referring to FIG. 2A, a plurality of cars and information related thereto is shown within the dataset 200. FIG. 2A also illustrates a user interface 210 including a plurality of tiles 211-214 which are generated based on data included in the dataset 200. Here, the tiles includes one tile (211) visually representing a measure of data (quantity) calculated from the dataset 200 and three other tiles (212, 213, and 214) visually representing three attributes (Color, Car, and Category)

identified from the dataset 200. In this example, the plurality of attribute tiles 212-214 are associated with attributes of a car.

In FIG. 2B, a user performs an action of dragging the tile 213 associated with a car model attribute data entity towards the tile 214 associated with a car type category attribute as shown in user interface 220*a*. According to various embodiments, the system may detect the user action and generate a new tile 215*a* as shown in user interface 220*b*. In this example, the new tile 215*a* is associated with a hierarchy data entity based on a hierarchy of attributes of data from the dataset 200. The hierarchy is created based on the attributes represented by the two tiles 213 and 214 and is visually represented by the new tile 215*a*. For example, the system may detect that content of the attributes represented by tiles 213 and 214 are not similar based on the imported dataset 200, and generate a hierarchy entity. In this example, a "Car hierarchy" is created with a first level being a car type category and a second level being a model of the car, but it may be differently created.

Figure 2C:
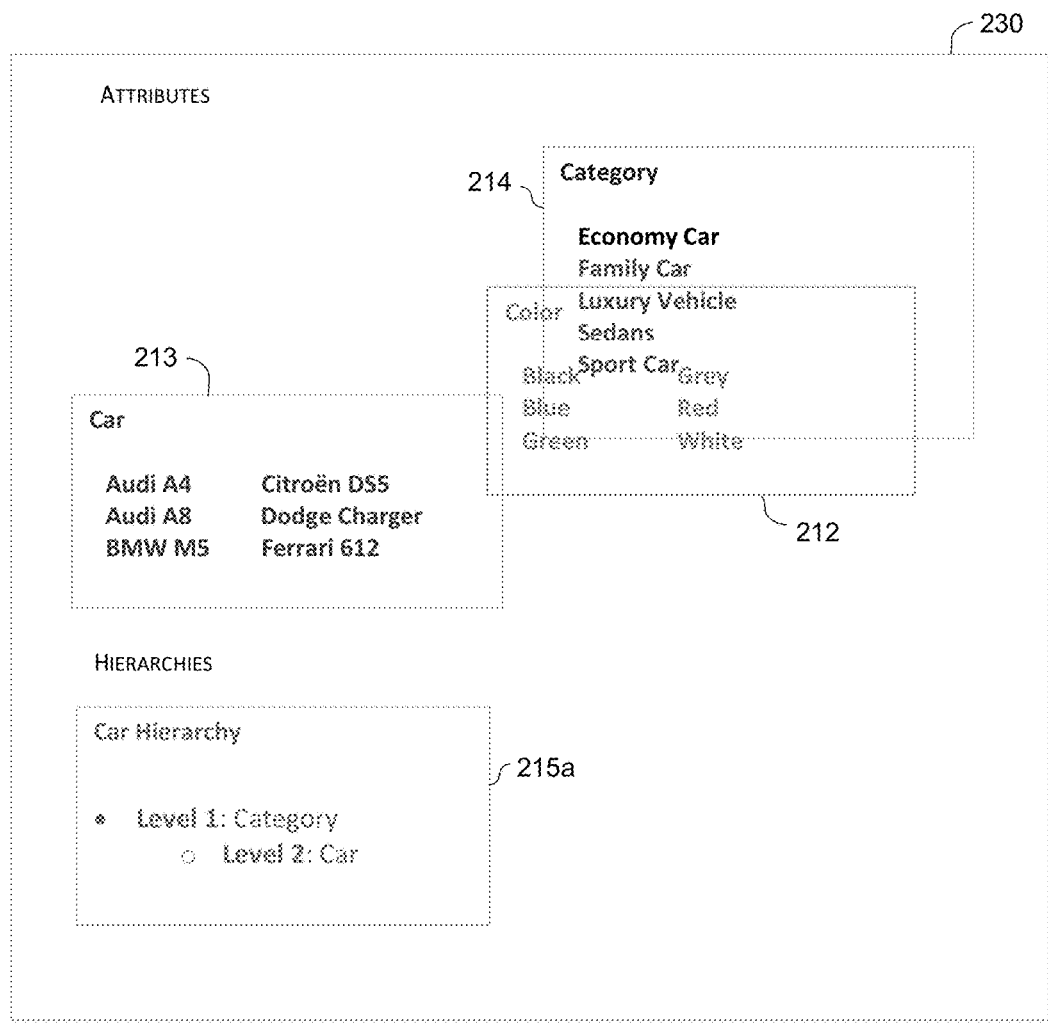
Figure 2D:
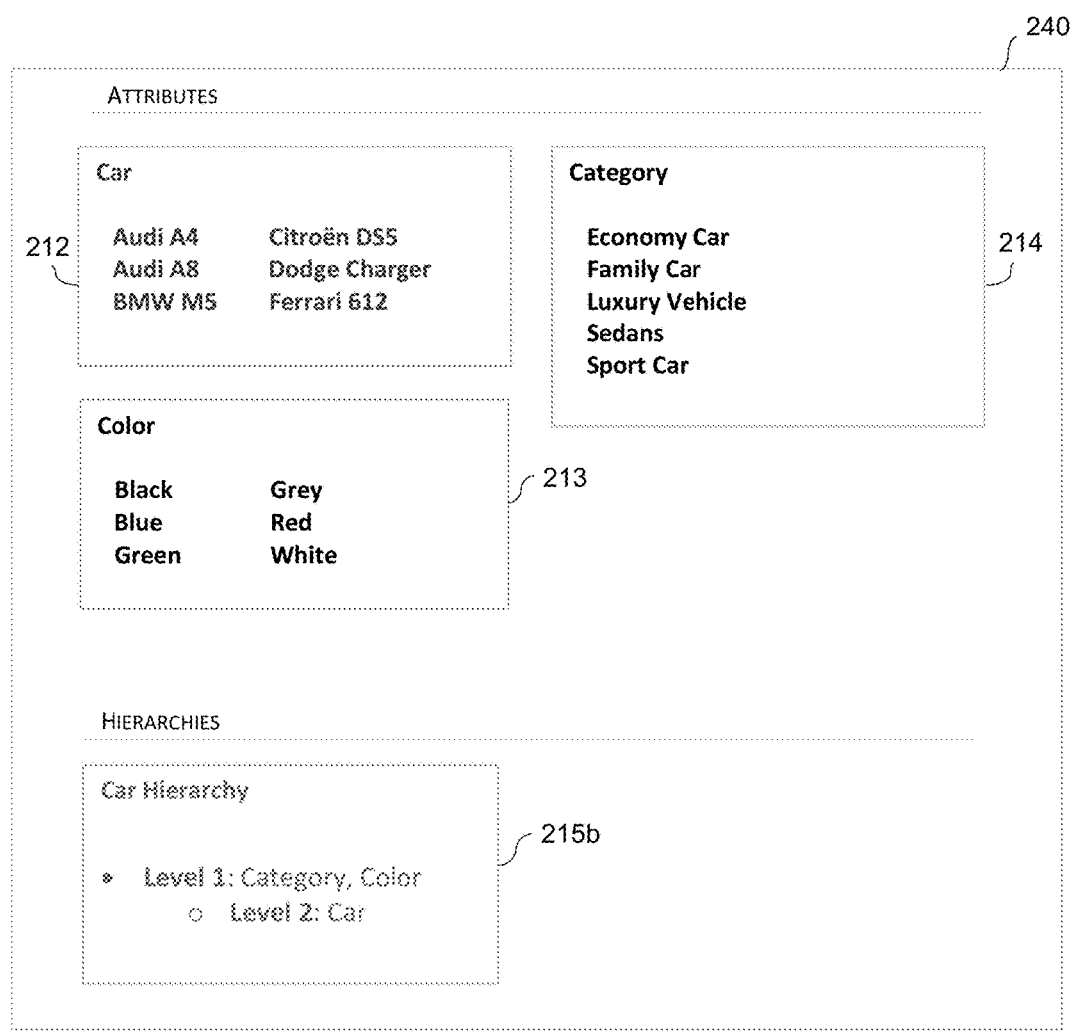

FIG. 2C illustrates a user action of dragging tile 212 visually representing underlying car color types of the dataset 200, and dropping the tile 212 in the vicinity of the tile 214 visually representing car type categories of the underlying dataset 200 via user interface 230. In response, as shown in FIG. 2D, the system detects that the attribute content is not similar, and a new link is created between these two entities such that Color becomes a detail of Category as shown in tile 215*b* of user interface 240.

Figure 3A:
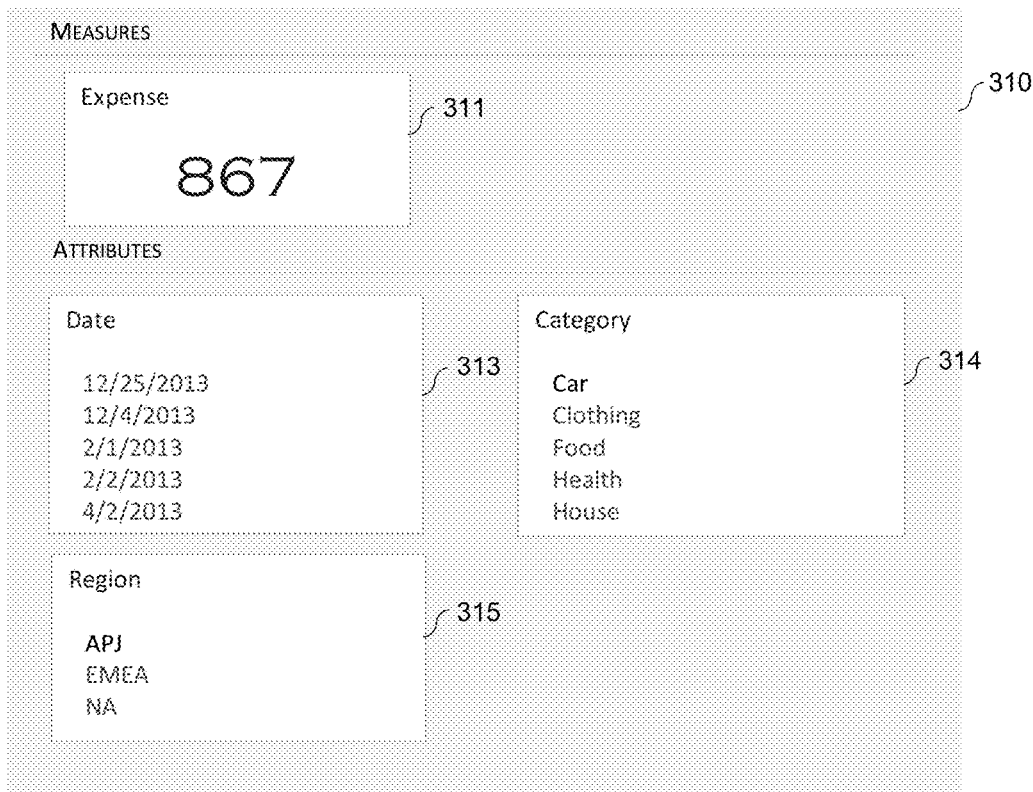
FIGS. 3A-3D are diagrams illustrating various enrichment processes of modifying or creating visual representations based on files in accordance with example embodiments.
Figure 3B:
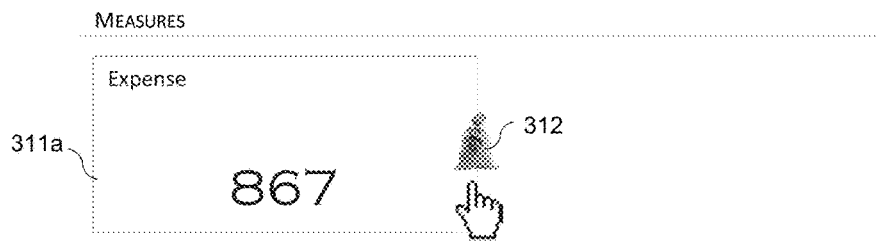
Figure 3B:
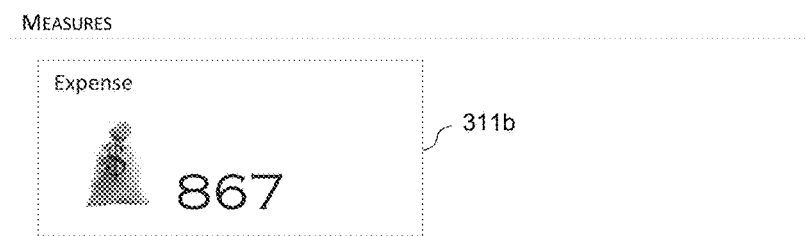
Figure 3C:
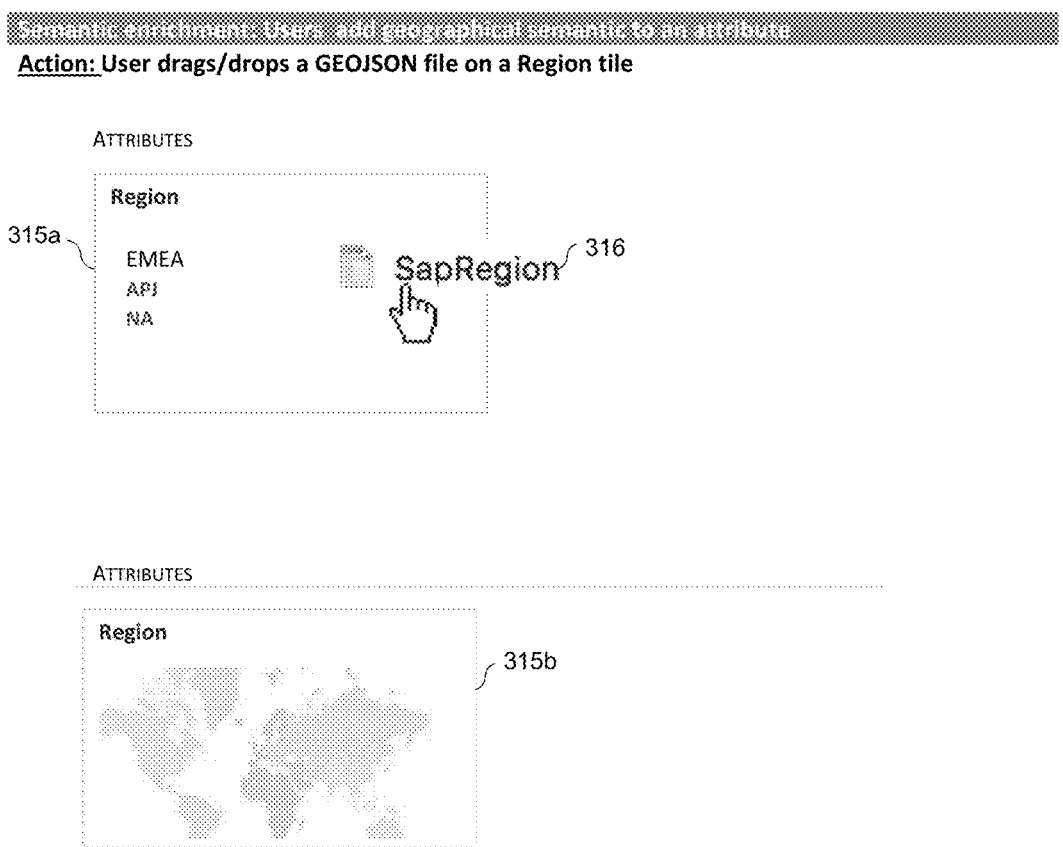
Figure 3D:
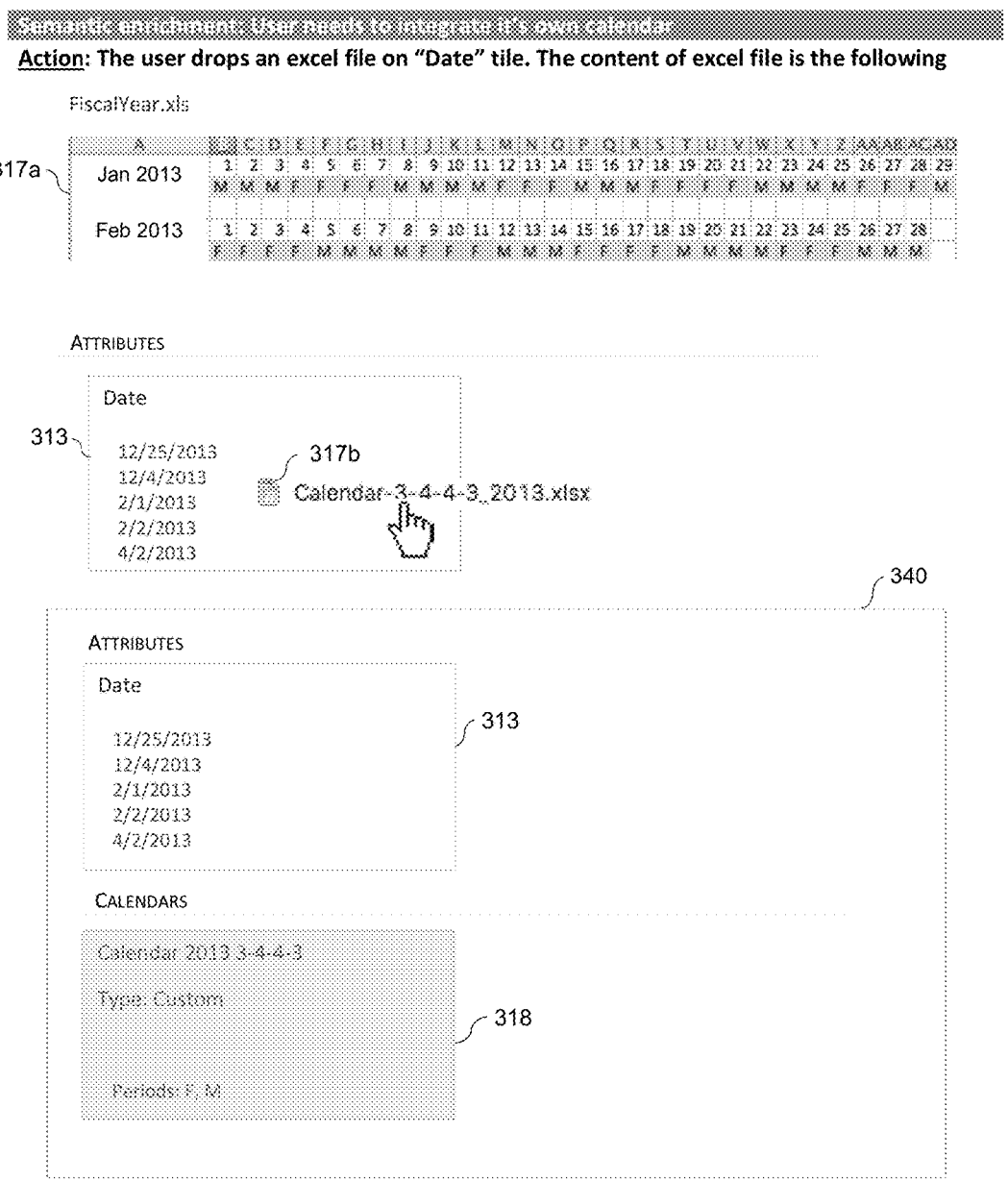

FIGS. 3A-3D illustrate various enrichment processes for modifying or creating visual representations based on data files in accordance with example embodiments. FIG. 3A illustrates a dataset 300 in table form and a user interface 310 in which four tiles are shown visually representing a measure 311 and three attributes 313-315, respectively. The examples performed in FIGS. 3B-3D are based on the dataset 300 and the user interface 310. In this example, the dataset 300 may be included in a file such as a spreadsheet file (e.g., Excel), a .csv file, a word document, and the like. The expense measure represented by tile 311 may be calculated based on a total amount of expenses include in the dataset 300. Furthermore, the data attribute (represented by tile 313), the category attribute (represented by tile 314), and the geographic region attribute (represented by tile 315) may be identified by the system from data included in the dataset 300. Furthermore, the system may generate and display the tiles 311, 313, 314, and 315 to visually represent the underlying data entities (measures and attributes).

FIG. 3B illustrates an example of a user selecting an image file 312 and dragging the image file 312 within a vicinity of the expense measure tile 311. In this example, the expense measure is initially represented by 311*a*. When the user drags the image file 312 (e.g., an icon, link, graphic, etc. of the image file) within the vicinity of the expense measure tile 311*a*, the system may add an image included in the image file 312 to the visual representation of the expense measure within the tile 311*b*. In other words, the visual representation of the data entity (i.e., the expense measure) within the tile 311*b* may be modified based on the image file by a simple user gesture of selecting a link, icon, graphic, or the like, associated with the image file 312 and dropping it near or on the tile 312.

FIG. 3C illustrates an example of a user selecting a geographic file 316 and dragging the geographic file 316 within a vicinity of the geographic region attribute tile 315. In this example, the geographic region attribute tile is initially represented by 315*a* and includes an alphanumeric listing of geographic regions. When the user drags and drops a geographic file 316 (e.g., a GeoJSON file format, or the like) the system detects that the file has a GeoJSON format and stores it. The geographic region attribute tile 315*a* represents an entity that is tagged as geographical and a matching values resolution is started. In this example, a geographic map is generated by the system based on the geographic file 316 and the geographic data represented by the geographic region attribute tile 315*a*. Furthermore, the geographic map is visually displayed within the geographic region attribute tile 315*b* thereby modifying the tile 315*a* which initially included text only to include a geography in the format of a map.

FIG. 3D illustrates an example of a user selecting a spreadsheet file having a calendar format included therein and dropping the spreadsheet file within a vicinity of the date attribute tile 313. A calendar format 317*a* of the spreadsheet file is shown above and a representation of the file is shown as tile 317*b* which has the shape of an icon. In this example, the user drops the spreadsheet file 317*b* on the date attribute tile 313. In response, the system imports the calendar file and detects periods of time. The calendar is stored and a link between date and periods of time are done, so that the user can drill expenses according to periods of time. Furthermore, a new data entity of the calendar is created and a visual representation of the calendar is displayed on a new tile 318 within user interface 340.

Figure 4:
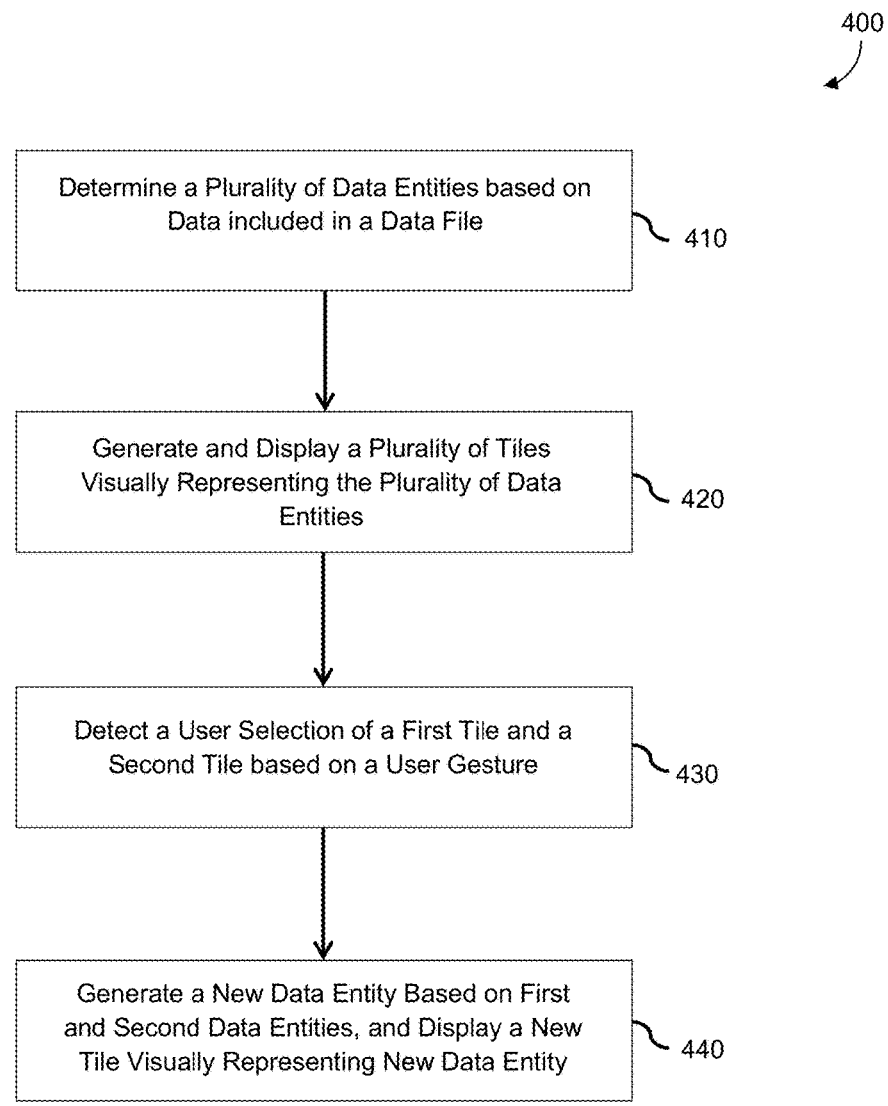
FIG. 4 is a diagram illustrating a method for performing semantic enrichment in accordance with an example embodiment.

FIG. 4 is a diagram illustrating a method 400 for performing semantic enrichment in accordance with an example embodiment. The method 400 may be performed by one or more devices in a semantic creation and enhancement environment. For example, the method may be performed by a server, a workstation, a mobile station, a tablet, a laptop, a notepad, a cloud platform, and the like. In some examples, the method 400 may be performed by multiple devices in conjunction with each other. Referring to FIG. 4, in 410, the method includes determining a plurality of data entities from one or more data files. For example, a data entity may be a measure calculated from a data file, an attribute of the data identified from the data file, a hierarchy of the data in the data file, and the like. Here, one or more measures may be calculated based on data in the data file and/or one or more attributes may be identified from the data in the data file. In this example, the data file may include one or more tables of data such as a spreadsheet, an excel file, a document file, and the like. As another example, the data entity may be a data entity such as an icon or an image representing another file. In this example, a first data entity may represent a measure or other data entity obtained from a first data file and a second data entity may represent an image or a calendar format included in a second file.

In 420, the method includes displaying a plurality of tiles on a user interface, each displayed tile visually representing a data entity obtained from a data file. Each data entity obtained in 410 may have its own respective tile displayed on the user interface. The tiles may have any shape and/or size and may have the same shape or different shapes as each other. Also, the tiles may be arranged in any desired pattern within the user interface. In 430, the method includes detecting, via the user interface, a selection of a first displayed tile visually representing a first data entity and a second displayed tile visually representing a second data entity. For example, the detected selection may be a user operation in which the user drags and drops a first tile within a vicinity (e.g., such that it contacts or such that it is within a predetermined distance of) of a second tile. In response to receiving the selection via the user interface, in 440 the method includes generating a new data entity based on the first data entity visually represented by the first displayed tile and the second data entity visually represented by the second tile, and displaying a new tile visually representing the newly generated data entity.

As an example, a first displayed tile may visually represent a first measure calculated based on data from the data file and the second displayed tile may visually represent a second measure calculated based on data from the data file. In this example, in response to detecting the user selection of the first and second tiles, in 440, the method may perform a mathematical operation using the first measure and the second measure to generate a new measure, and the displayed new tile may visually represent the newly generated measure. The mathematical operation may be arithmetic such as addition, subtraction, multiplication, division, and/or a combination thereof. As another example, the mathematical operation may be a predefined algorithm, and the like. As another example, a first displayed tile may visually represent a first attribute of data included in the data file and a second displayed tile may visually represent a second attribute of data included in the data file. In this example, in response to detecting the user selection of the first and second tiles, in 440, the method may generate a hierarchy including the first and second attributes and the displayed new tile visually represents the generated hierarchy of attributes.

As another example, a first displayed tile may visually represents a measure calculated based on data from the data file and a second displayed tile visually represents an image or a calendar format included in another file. In this example, in response to detecting the user selection of the first and second tiles, in 440 the method may generate a modified tile may adding the image associated with the second tile to the visually representation of the first tile. As another example, the method may generate a calendar using the calendar format associated with the second tile based on the date information associated with the first tile and generate a new tile representing the calendar. As another example, a first tile may visually represent an attribute identifying data from the data file and the second displayed tile may visually represent a geographic file including a geography such as a GeoJSON file. In this example, in response to detecting the user selection of the first and second tiles, in 440, the method may generate a geographical map based on the attribute of the first displayed tile and the geography of the geographic file, and the displayed new tile visually represents the generated geographical map.

Figure 5:
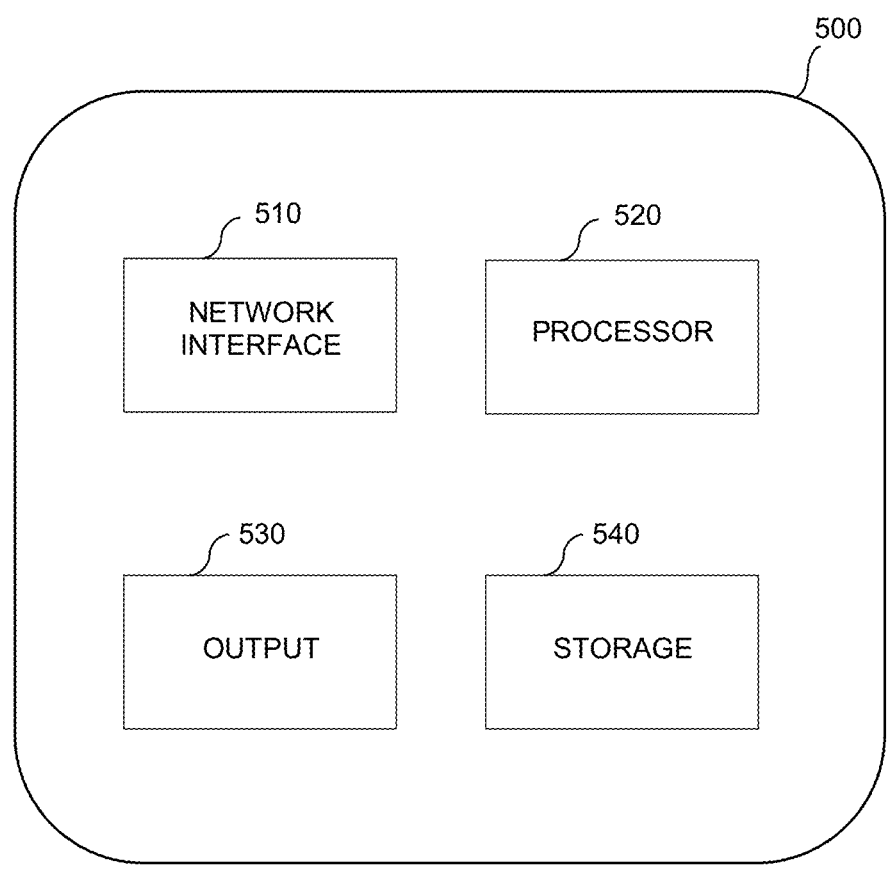
FIG. 5 is a diagram illustrating a device for performing semantic enrichment in accordance with an example embodiment.

FIG. 5 is a diagram illustrating a device 500 for performing semantic enrichment in accordance with an example embodiment. For example, the device 500 may be a server, a user device such as a workstation, mobile phone, tablet, kiosk, appliance, television, and the like, or some other device or combination of devices. For example, the device 500 may perform the method of FIG. 4. Referring to FIG. 5, the device 500 includes a network interface 510, a processor 520, an output 530, and a storage device 540. Although not shown in FIG. 5, the device 500 may include other components such as a display, an input unit, a receiver/transmitter, and the like. The network interface 510 may transmit and receive data over a network such as the Internet, a private network, a public network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the device 500, an externally connected display, a cloud platform, another device, and the like. The storage device 540 is not limited to any particular storage device and may include any known memory device such as RAM, ROM, hard disk, and the like.

According to various embodiments, the device 500 may be included in a system for performing semantic enrichment. For example, the device 500 may be a back-end server, cloud platform, or other computing device receiving selections from a user device over a network. Here, the network interface 510 may receive selections or other information such as requests, messages, instructions, etc. from the user device. As another example, the device 500 may be a user device (e.g., a tablet, mobile device, computer, laptop, notepad, appliance, kiosk, etc.) performing semantic enrichment on an embedded display thereof or a display externally connected thereto. Here, the device 500 may include an input unit and a display and may perform that semantic enrichment via a user selection through the input unit and display the semantic enrichment on the embedded or externally connected display.

According to various embodiments, the processor 520 may generate a plurality of data entities based on one or more data files. For example, the files may be stored in the storage device 540 and/or they may be received from another device via the network interface 510. The output 530 may display a plurality of tiles on a user interface, each displayed tile visually representing a data entity obtained from a data file. For example, the output 530 may output the plurality of tiles to an embedded display device, an externally connected display device, or a display device associated with or connected to another device such as a user station. The processor 520 may detect, via the user interface, a selection of a first displayed tile visually representing a first data entity and a second displayed tile visually representing a second data entity. For example, the processor 520 may detect a drag-and-drop operation of the first tile or the second tile with respect to the other. It should be appreciated that the selection is not limited to a drag-and-drop operation and may include any selection or gesture performed by a user such as a double-click input, a keyboard input, a mouse input, a vocal input, a gesture or hand movement input captured by an imaging device, and the like.

In response to detecting the selection via the user interface, the processor 520 may generate a new data entity based on the first data entity visually represented by the first displayed tile and the second data entity visually represented by the second tile, and also generate a new tile based on the new data entity. For example, the newly generated data entity may have a brand new tile provided therewith that is not previously shown on the user interface or it may incorporated into an existing tile such as by a modification of the first tile or the second tile. Furthermore, the output 530 may display the newly generated tile visually representing the newly generated data entity. According to various embodiments, a displayed tile may visually represent a measure calculated from a data file, an attribute or group of attributes extracted from the data file and identifying or describing the data, a hierarchy of the data, a calendar, and the like. In some examples, the plurality of tiles include at least one measure calculated from the data file and at least one attribute of the data included in the data file.

For example, in response to a user operation with respect to two tiles, the processor 520 may perform a mathematical operation using a first measure represented by a first tile and a second measure to generate a new measure, and the output 530 may display a new tile visually representing the newly generated measure. As another example, the first tile may represent a first attribute of data included in the data file and the second tile may represent a second attribute of data included in the data file. In this example, the processor 520 may generate a hierarchy including the first and second attributes, and the output 530 may display a new tile visually representing the generated hierarchy of attributes. As another example, the first tile may represent a measure or an attribute, and the second tile may represent an image file. In this example, the processor 520 may modify the visual representation within the first tile by adding the image included in the image file to the visual representation of the measure within the first tile. As another example, the first tile may visually represent a plurality of date attributes based on dates included in the data file and the second tile may represent a calendar file including a calendar format. In this example, the processor 520 may generate a new calendar based on the date attribute of the first displayed tile and the calendar format of the calendar file. As yet another example, the first file may be represent a geographic attribute and the second file may represent a geographic file. In this example, the processor 520 may generate a geographical map based on the attribute of the first displayed tile and the geography of the geographic file.

In various embodiments, the system includes a front-end device or devices and a back-end device or devices. The front-end may include an application having a Hypertext Markup Language (HTML) and JavaScript based user interface that uses an internal framework such as Flapjack, or the like. Also, the back-end may have an application written in Java, and may perform various operations, for example, web crawling, query databases, suggestion services, usage services, administration services, and the like. In some embodiments, each of the tiles and the associated data entities may be stored in a knowledge graph database. Also, the master data on which the data entities are generated may be stored in the same database or a different database. In these examples, the front-end may interact with the back-end via Hypertext Transfer Protocol (HTTP) REST API calls.

Figure 6:
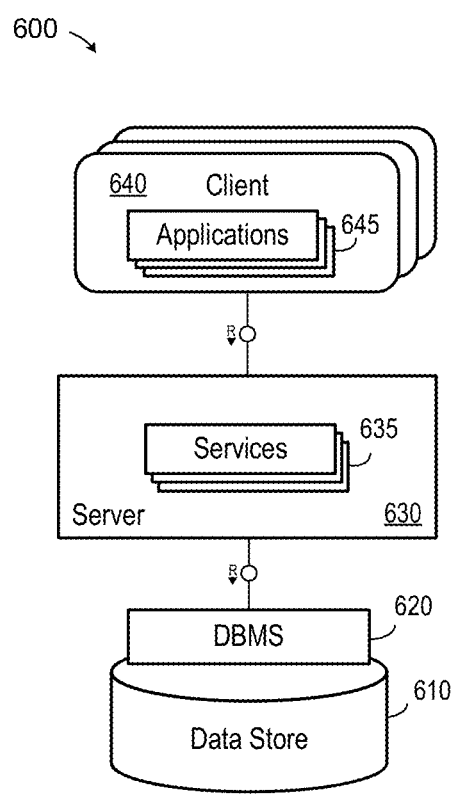
FIG. 6 is a diagram illustrating a database architecture according to some embodiments.

FIG. 6 is a block diagram of architecture 600 according to some embodiments. It should be appreciated that the embodiments are not limited to architecture 600 or to a database architecture. Referring to FIG. 6, the architecture 600 includes a data store 610, a database management system (DBMS) 620, a server 630, services 635, clients 640 and applications 645. Generally, services 635 executing within server 630 receive requests from applications 645 executing on clients 640 and provides results to applications 645 based on data stored within data store 610.

More specifically, server 630 may execute and provide services 635 to applications 645. Services 635 may comprise server-side executable program code (e.g., compiled code, scripts, etc.) which provide functionality to applications 645 by providing user interfaces to clients 640 such as the user interfaces shown in FIGS. 1A-3D, receiving requests from applications 645 (e.g., drag-and-drop operations), retrieving data from data store 610 based on the requests, processing the data received from data store 610, and providing the processed data to applications 645 (e.g., generated tiles, new tiles, modified tiles, etc.). Services 635 may be made available for execution by server 630 via registration and/or other procedures which are known in the art.

In one specific example, a client 640 executes an application 645 to present a user interface to a user on a display of the client 640 and the user interface includes a plurality of tiles according to various embodiments. The user enters an input or gesture into the user interface one or more data entities. The application may pass a request based on the input to one of services 635. An SQL script is generated based on the request and forwarded to DBMS 620. DBMS 620 executes the SQL script to return a result set based on data of data store 610, and the application 645 creates a report/visualization based on the result set.

Server 630 provides any suitable protocol interfaces through which applications 645 executing on clients 640 may communicate with services 635 executing on application server 630. For example, server 130 may include a HyperText Transfer Protocol (HTTP) interface supporting a transient request/response protocol over Transmission Control Protocol (TCP), and/or a Web Socket interface supporting non-transient full-duplex communications between server 630 and any clients 640 which implement the Web Socket protocol over a single TCP connection.

One or more services 635 executing on server 630 may communicate with DBMS 620 using database management interfaces such as, but not limited to, Open Database Connectivity (ODBC) and Java Database Connectivity (JDBC) interfaces. These types of services 635 may use Structured Query Language (SQL) to manage and query data stored in data store 610.

DBMS 620 serves requests to query, retrieve, create, modify (update), and/or delete data of data store 610, and also performs administrative and management functions. Such functions may include snapshot and backup management, indexing, optimization, garbage collection, and/or any other database functions that are or become known. DBMS 620 may also provide application logic, such as database procedures and/or calculations, according to some embodiments. This application logic may comprise scripts, functional libraries and/or compiled program code.

Server 630 may be separated from or closely integrated with DBMS 620. A closely-integrated server 630 may enable execution of services 635 completely on the database platform, without the need for an additional server. For example, according to some embodiments, server 630 provides a comprehensive set of embedded services which provide end-to-end support for Web-based applications. The services may include a lightweight web server, configurable support for Open Data Protocol, server-side JavaScript execution and access to SQL and SQL Script. Server 630 may provide application services (e.g., via functional libraries) using services 635 that manage and query the data of data store 610. The application services can be used to expose the database data model, with its tables, views and database procedures, to clients 640. In addition to exposing the data model, server 630 may host system services such as a search service.

Data store 610 may comprise any query-responsive data source or sources that are or become known, including but not limited to a structured-query language (SQL) relational database management system. Data store 610 may comprise a relational database, a multi-dimensional database, an eXtendable Markup Language (XML) document, or any other data storage system storing structured and/or unstructured data. The data of data store 610 may be distributed among several relational databases, dimensional databases, and/or other data sources. Embodiments are not limited to any number or types of data sources.

In some embodiments, the data of data store 610 may comprise one or more of conventional tabular data, row-based data, column-based data, and object-based data. Moreover, the data may be indexed and/or selectively replicated in an index to allow fast searching and retrieval thereof. Data store 610 may support multi-tenancy to separately support multiple unrelated clients by providing multiple logical database systems which are programmatically isolated from one another.

Data store 610 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

As described above, architecture 600 may include metadata defining objects which are mapped to logical entities of data store 610. The metadata be stored in data store 610 and/or a separate repository (not shown). The metadata may include information regarding dimension names (e.g., Country, Year, Product), dimension hierarchies (e.g., Country>State>City), measure names (Profit, Units, Sales) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 640 may comprise one or more devices executing program code of an application 645 for presenting user interfaces to allow interaction with application server 630. The user interfaces of applications 645 may comprise user interfaces suited for reporting, data analysis, and/or any other functions based on the data of data store 610. Presentation of a user interface as described herein may comprise any degree or type of rendering, depending on the type of user interface code generated by server 630. For example, a client 640 may execute a Web Browser to request and receive a Web page (e.g., in HTML format) from application server 630 via HTTP, HTTPS, and/or Web Socket, and may render and present the Web page according to known protocols. One or more of clients 640 may also or alternatively present user interfaces by executing a standalone executable file (e.g., an .exe file) or code (e.g., a JAVA applet) within a virtual machine. In another method, one of more of clients 640 execute applications 645 loaded from server 630, that receive data and metadata by requests to services 635 executed on the server 630. Data and metadata is processed by the applications 645 to render the user interface on the client 640.

According to various embodiments, provided is a system and method for performing semantic creation and semantic enrichment of visually displayed data. The example embodiments may extract or calculate various data entities from a data file or a plurality of data files. The data entities may include measures, attributes, hierarchies, calendars, geographies, images, and the like. The data entities may be visually represented through a plurality of tiles on a user interface. In response to a simple user gesture via the user interface with respect to two tiles, such as a drag-and-drop operation, the system and method may create new semantics or modify and enrich existing semantic information without the need for an IT specialist or an administrator.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A semantic generating device, comprising:
a processor configured to:
display a plurality of tiles on a user interface, each tile visually displaying a data value and a description of a variable type that the data value represents on a surface thereof, wherein the data value represents a value determined from content included within at least one underlying data set;
detect, via the user interface, a selection of a first tile visually displaying a first data value and a first description on a surface thereof and a second tile visually displaying a second data value and a second description on a surface thereof;
in response to detecting the selection via the user interface, generate at least one of a new measure determined from the first data value and the second data value displayed on the respective surfaces and a new attribute relationship value determined based on a hierarchical relationship between a variable type of the first description and a variable type of the second description displayed on the respective surfaces; and display a new tile visually displaying the at least one new measure and the new attribute relationship value on a surface thereof, and which is independent from the first and second tiles.

2. The semantic generating device of claim 1, wherein a surface of each tile from among the plurality of the tiles visually displays at least one of a measure calculated based on data included in a data file and an attribute identifying data included in the data file.

3. The semantic generating device of claim 1, wherein the detected selection comprises a drag-and-drop operation of the first tile within a predetermined vicinity of the second tile.

4. The semantic generating device of claim 1, wherein the surface of the first tile visually displays a first measure calculated by the processor from a data file and the surface of the second tile visually displays a second measure calculated by the processor from the data file,
the processor performs a mathematical operation using the first measure and the second measure displayed on the respective surfaces to generate a new measure, and
the processor displays the newly generated measure on the surface of the new tile.

5. The semantic generating device of claim 1, wherein the first tile visually displays a first attribute of data and the second tile visually displays a second attribute of data,
the processor generates a hierarchy including the first and second attributes, and
the processor displays the generated hierarchy of attributes on the surface of the new tile.

6. The semantic generating device of claim 1, wherein surface of the first tile visually displays a measure calculated based on data from a data file and a third tile visually displays an image file,
the processor adds an image included in the image file to the visual display of the measure within the first tile based on a selection of the first and third tiles, and
the processor displays another new tile that visually displays the measure within the first tile including the added image.

7. The semantic generating device of claim 1, wherein the surface of the first tile visually displays an attribute identifying data from a data file and a surface of a third tile visually displays a geographic file including a geography, and
the processor generates a geographical map based on the attribute of the first tile and the geography of the geographic file based on a selection of the first and third tiles, and
the processor displays a new tile visually representing the generated geographical map.

8. The semantic generating device of claim 1, wherein the surface of the first tile visually displays a date-based attribute identifying dates from a data file and a surface of a third tile visually displays a calendar file including a calendar format,
the processor generates a new calendar based on the date attribute of the first displayed tile and the calendar format of the calendar file based on a selection of the first and third tiles, and
the processor displays another new tile visually representing the newly generated calendar.

9. A method comprising:
displaying a plurality of tiles on a user interface, each tile visually displaying a data value and a description of a variable type that the data value represents on a surface thereof, wherein the data value represents a value determined from content included within at least one underlying data set;
detecting, via the user interface, a selection of a first tile visually displaying a first data value and a first description on a surface thereof and a second tile visually displaying a second data value and a second description on a surface thereof; and
in response to detecting the selection via the user interface, generating at least one of a new measure determined from the first data value and the second data value displayed on the respective surfaces and a new attribute relationship value determined based on a hierarchical relationship between a variable type of the first description and a variable type of the second description displayed on the respective surfaces, and displaying a new tile that displays the at least one new measure and the new attribute relationship value on a surface thereof, and which is independent from the first and second tiles.

10. The method of claim 9, wherein a surface of each tile from among the plurality of the tiles visually displays at least one of a measure calculated based on data included in a data file and an attribute identifying data included in the data file.

11. The method of claim 9, wherein the detected selection comprises a drag-and-drop operation of the first tile within a predetermined vicinity of the second tile.

12. The method of claim 9, wherein the surface of the first tile visually displays a first measure calculated from a data file and the surface of the second tile visually displays a second measure calculated from the data file, and
the generating comprises performing a mathematical operation using the first measure and the second measure displayed on the respective surfaces to generate a new measure, and the displayed new tile visually displays the newly generated measure on the surface thereof.

13. The method of claim 9, wherein the first tile visually displays a first attribute of data included in a data file and the second tile visually displays a second attribute of data included in the data file, and
the generating comprises generating a hierarchy including the first and second attributes, and the displayed new tile visually displays the generated hierarchy of attributes on the surface thereof.

14. The method of claim 9, wherein the surface of the first tile visually displays a measure calculated based on data from a data file and a surface of a third tile visually displays an image file, and
the generating comprises adding an image included in the image file to the visual display of the measure within the first tile to generate the displayed new tile based on a selection of the first and third tiles.

15. The method of claim 9, wherein the surface of the first tile visually displays an attribute identifying data from a data file and a surface of a third tile visually displays a geographic file including a geography, and
the generating comprises generating a geographical map based on the attribute of the first tile and the geography of the geographic file, and displaying another new tile that visually represents the generated geographical map based on a selection of the first and third tiles.

16. The method of claim 9, wherein the surface of the first tile visually displays a date-based attribute identifying dates from a data file and a surface of a third tile visually displays a calendar file including a calendar format, and the generating comprises generating a new calendar based on the date attribute of the first tile and the calendar format of the calendar file, and displaying another new tile that visually represents the newly generated calendar based on a selection of the first and third tiles.

17. A non-transitory computer readable medium having stored therein instructions that when executed cause a computer to perform a method comprising:
displaying a plurality of tiles on a user interface, each tile visually displaying a data value and a description of a variable type that the data value represents on a surface thereof, wherein the data value represents a value determined from content included within at least one underlying data set;
detecting, via the user interface, a selection of a first tile visually displaying a first data value and a first description on a surface thereof and a second tile visually displaying a second data value and a second description on a surface thereof; and
in response to detecting the selection via the user interface, generating at least one of a new measure determined from the first data value and the second data value displayed on the respective surfaces and a new attribute relationship value determined based on a hierarchical relationship between a variable type of the first description and a variable type of the second description displayed on the respective surfaces, and displaying a new tile that displays the at least one new measure and the new attribute relationship value on a surface thereof, and which is independent from the first and second tiles.

18. The non-transitory computer-readable medium of claim 17, wherein a surface of each tile from among the plurality of the tiles visually displays at least one of a measure calculated based on data from data file and an attribute identifying data from the data file.

19. The non-transitory computer-readable medium of claim 17, wherein the detected selection comprises a drag-and-drop operation of the first tile within a predetermined vicinity of the second tile.

20. The non-transitory computer-readable medium of claim 17, wherein the surface of the first tile visually displays a first measure calculated based on data included in a data file and the surface of the second tile visually displays a second measure calculated based on data included in the data file, and
the generating comprises performing a mathematical operation using the first measure and the second measure displayed on the surfaces thereof to generate a new measure, and the displayed new tile visually displays the newly generated measure on the surface thereof.

* * * * *